Sept. 19, 1967  F. O. JOHNSON  3,343,038
PHASE LOSS DETECTOR AND CIRCUIT CONTROLLED THEREBY
Filed Feb. 26, 1965

INVENTOR
Frederick Owen Johnson
BY
ATTORNEY

United States Patent Office 3,343,038
Patented Sept. 19, 1967

3,343,038
PHASE LOSS DETECTOR AND CIRCUIT
CONTROLLED THEREBY
Frederick O. Johnson, Monroeville, Pa., assignor to Westinghouse Electric Corporation, Pittsburgh, Pa., a corporation of Pennsylvania
Filed Feb. 26, 1965, Ser. No. 435,539
17 Claims. (Cl. 317—46)

ABSTRACT OF THE DISCLOSURE

A three-phase power system is shown with a thyristor in each phase line, each thyristor being shunted by a half-wave rectifier in series with one of three primaries of a transformer having a secondary winding connected to a control input of a control signal generator whose output is connected to the gates of the thyristors. The control input to the signal generator includes a rectifier having a threshold voltage value which is above the transformer output when the system is three-phasing, and below the transformer output when the system is single-phasing. The signal generator is cut off in response to single-phasing, thereby to turn off the thyristors.

---

Figures 1, 2:
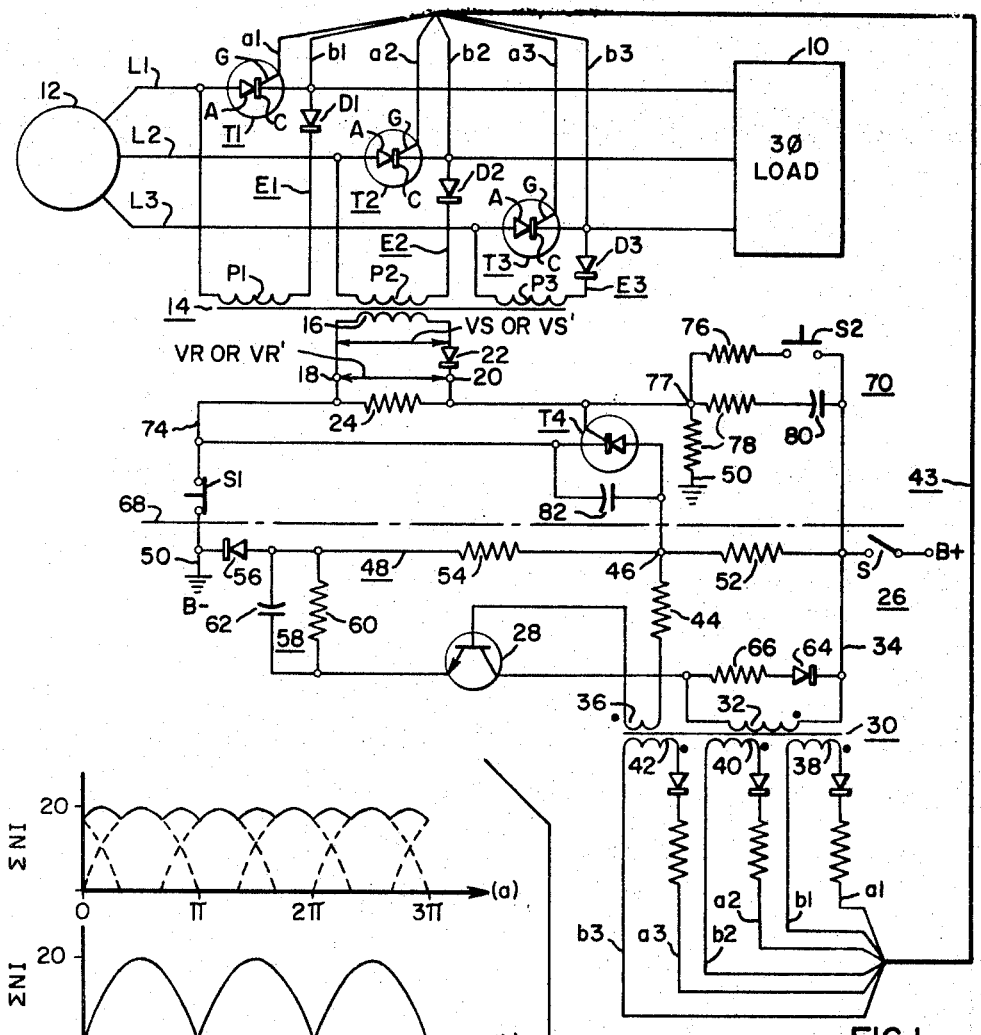

This invention relates to apparatus for detecting phase loss faults in a polyphase system and for effecting a control function in response to phase loss in a polyphase system. "Phase loss" refers to operation with less than full phase complement, for example "single phasing" in a three-phase system.

Previous single-phase fault detectors were generally complex and/or slow in response.

An object of the present invention is to provide a novel phase loss detector involving a simple circuit configuration.

Another object of the invention is to provide a novel phase loss detector having a fast response.

A further object of the invention is to provide in a polyphase system, a novel, simple, high speed, phase loss detector and apparatus for effecting a control function in response to the detector.

In accordance with one embodiment of the invention, half wave currents from each of the phase lines of a polyphase system are supplied to separate input windings of a transformer arrangement having an output winding connected through a rectifier to an output circuit. The system components are so related that when the system is full-phasing (all phases operating properly), the output of the transformer output winding is below the threshold level of the rectifier, whereby only negligible current is passed by the rectifier, thus effectively blocking current to the output circuit. On the other hand, when a phase loss occurs, the output of the transformer output winding is above the threshold level of the rectifier, resulting in appreciable current flow through the rectifier to the output circuit. The presence or lack of appreciable output current passed by the rectifier can be employed to operate an annunciator or to effect control functions such as changing the status of current control elements, for example turning main switching elements on and off.

The threshold voltage of a device is the voltage at which transition from low to high conductance occurs. This may represent a sharp or a "soft" knee on the volt-ampere characteristic of the device.

Other and further objects and advantages of the present invention will become apparent from the following detailed description taken in connection with the drawings wherein a preferred embodiment of the invention is illustrated.

In the drawings:

FIGURE 1 is a schematic diagram of a three-phase power system including a single-phase detector and a shut-off circuit which responds to the detector; and FIG. 2 is a chart showing comparative waveforms occurring in certain parts of the circuit of FIG. 1 when three-phasing and when single-phasing.

Referring now to FIG. 1, three-phase power is supplied to a three-phase load 10 from a three phase AC source 12 by way of supply lines L1, L2 and L3. In series in each line there is a current control device T having a control element G, which device is rendered conductive in response to a control signal applied to its control element. The current control device may, for instance, be a controlled rectifier. Controlled rectifiers are characterized in that they are rendered conductive in a particular direction in response to a suitable control signal applied to their control elements. Suitable examples of controlled rectifiers are thyratrons and solid state controlled rectifiers. A well known example of a solid state controlled rectifier is a thyristor such as a silicon controlled rectifier.

By way of example, the current control devices T in FIG. 1 are shown as thyristors, one form of solid state controlled rectifier. The thyristors T for lines L1, L2 and L3 are respectively labeled T1, T2 and T3. Each of the thyristors T includes an anode A, a cathode C and a control electrode G. The theory of operation of thyristors is well known, and needs no repetition here.

It will be noted that the thyristors T1, T2 and T3 are similarly poled, that is, like electrodes of all are connected to the same sides or ends of lines L1, L2 and L3. In the particular example shown, all the anodes are connected to the source sides of the lines while all the cathodes are connected to the load end of the lines.

Connected across each thyristor T1, T2 and T3 is an asymmetric circuit E. Each asymmetric circuit E includes an asymmetric device D in series with a different one of a plurality of primary windings P1, P2 and P3 of a transformer 14. More specifically, an asymmetric circuit E1 connected across thyristor T1 includes the primary winding P1 in series with a half-wave rectifier D1. In like manner, an asymmetric circuit E2 shunted across thyristor T2 includes in series the primary winding P2 and a half-wave rectifier D2. Likewise, connected in parallel with thyristor T3 is a asymmetric circuit E3, including in series the primary winding P3 and a half-wave rectifier D3.

Each of the half-wave rectifiers D is oppositely related to the thyristor shunted by the asymmetric circuit carrying the rectifier D. Thus each of the thyristors T, when conductive, passes current on one half-cycle only, while the associated asymmetric circuit E connected thereacross passes current on the opposite half-cycle only. It is thus seen that each of the asymmetric circuits E is in series with its associated line to carry a half-wave of current in that line. More specifically, asymmetric circuit E1 is in series in line L1; asymmetric circuit E2 is in series with line L2; and asymmetric circuit E3 is in series with line L3. As a result the net primary excitation of transformer 14 is the sum of the instantaneous currents through the three primary windings.

Transformer 14 is provided with a secondary winding 16 inductively coupled to the primary windings P1, P2 and P3. Connected across the secondary winding 16 is an output circuit including output terminals 18 and 20 and an asymmetric device 22, such as the half-wave rectifier shown, interposed between the output terminals and the secondary winding 16, whereby the output terminals 18 and 20 are supplied with the rectifier output of transformer 16. A load impedance such as a resistor 24 is connected across the output terminals 18 and 20.

Assuming that the thyristors, T1, T2 and T3 are conditioned for conduction by appropriate control signals applied to their respective control electrodes G, and if the system is full-phasing in a (three-phase system), that is, all phases operating properly, the waveform of the net primary excitation will be as shown in FIG. 2(a) (ampere turn NI). The resulting output voltage waveform across the secondary 16 is shown at VS in FIG. 2(c). During a phase loss such as a single-phasing fault, the instantaneous current in one of the remaining conduction lines becomes equal and opposite of that in the other line. The resulting primary excitation of transformer 14 is shown in FIG. 2(b). The output voltage VS' of the secondary 16 for this condition is shown in FIG. 2(e). Thus the secondary 16 output voltage is referred to as VS when the system is operating full phase (three-phasing), and as VS' when single-phasing. It will be noted that when the system is full-phasing, that is, operating under full phase complement, the secondary voltage VS has three times the frequency of the secondary voltage VS' when the system is single-phasing as indicated in FIG. 2. It will also be noted that when the system is single-phasing, the peak values of the secondary voltage VS' are considerably higher than the peak values of VS when the system is full-phasing.

The primary-secondary ratio of transformer 14 and the rectifier 22 are so arranged that when the system is operating normally, that is, when it is three-phasing, the secondary voltage VS is below the forward threshold voltage value of the rectifier 22, and when the system is single-phasing, the secondary voltage VS' is above the forward threshold voltage value of the rectifier 22. For example, the rectifier forward threshold voltage may be 0.5 volt; the positive half-cycles of secondary voltage VS (system full-phasing) may be 0.4 volt; the positive half-cycles of secondary voltage VS' (system single-phasing) may be 1.5 volts; and the rectifier 22 passes appreciable current during positive half-cycles, only when their voltage magnitude is above the threshold voltage value of the rectifier. Thus for the system normal condition (all three phases operating properly) with the transformer secondary voltage VS (FIG. 2(c)), the rectifier 22 will substantially block current flow and there will be no appreciable output at terminals 18 and 20. The voltage across output terminals 18 and 20 for this condition is identified as VR in FIG. 2(d) and is shown to be substantially equal to zero.

On the other hand, when the system suffers a phase loss and is single-phasing, the transformer secondary voltage VS' being considerably higher than the threshold voltage of rectifier 22, the rectifier will pass substantial portions of the positive half cycles of the secondary voltage resulting in a substantial output across terminals 18 and 20. Under these conditions the output voltage across 18 and 20 is indicated as VR' in FIG. 2(f). In this figure, the voltage VR' appears as a series of positive pulses having a magnitude of about 1 volt.

Difference between output signals of transformer 14 due to normal three-phase excitation and to single-phase excitation is caused by two main factors:

(1) High DC content of net primary excitation and
(2) Comparatively low AC content. Because of these factors, it is possible to reduce secondary voltage VS to zero with proper transformer design.

While the example utilizes in its output circuit the forward threshold voltage of rectifier 22 as a detection parameter, the invention is also applicable for use with an output circuit employing a reverse threshold voltage (Zener) as the detection parameter.

In summary, it is seen that when the system is operating normally, that is, with full three-phase complement, there is substantially no output voltage on the output terminals 18 and 20 of the single-phase detector. However, if the system should lose a phase and operate in single phase mode, there will be an appreciable output voltage on the output terminals 18 and 20.

Any suitable utilization circuit may be connected to the output terminals 18–20. For example, the utilization circuit may be an annunciator circuit, or a circuit for performing a control function such as controlling the current control devices in the lines L1, L2 and L3. A useful function for such a utilization circuit is to cut-off the gating signals to the thyristors T1, T2 and T3 thereby to cut off the power from the source 12 to the load 10 in case of a phase fault such as single-phasing. Such an arrangement is shown by way of example in FIG. 1, wherein a control signal generator 26, which normally supplies firing pulses, is rendered ineffective to supply such control pulses when a voltage appears at output terminals 18 and 20 in response to single-phasing of the system.

By way of example, the control signal generator 26 is shown as a blocking oscillator employing an amplifying valve for instance the transistor indicated at 28. The oscillator 26 includes a transformer 30 having a primray winding 32 connected between a positive DC bus 34 and the collector of transistor 28. Transformer 30 further includes a positive feedback secondary winding 36 and three output secondary windings 38, 40 and 42, each of the latter being connected through a diode and a limiting resistor to the control circuit of a different one of thyristors T. More specifically, the output of winding 38 is connected across the gate-cathode junction of thyristor T1; the output of secondary winding 40 is connected across the gate-cathode junction of thyristor T2; and the output of winding 42 is connected across the gate cathode junction of thyristor T3. This plurality of connections is symbolized by the diagrammatic line 43.

One end of the feedback winding 36 is connected to the base of transistor 28, while the other end of the winding is connected through a current limiting resistor 44 to a tap 46 on a voltage divider 48 connected between the positive bus 34 and a negative D.C. bus 50, which are energized from a D.C. power supply (B+ B−) when a switch S is closed. The voltage divider 48 includes resistors 52 and 54 and a diode 56.

The emitter of transistor 28 is connected through an RC network 58 to the junction between resistor 54 and diode 56. The RC network 58 which determines the pulse length and repetition rate of the blocking oscillator 26 includes a resistor 60 and a capacitor 62.

A diode 64 in series with a resistor 66 is connected across the primary winding 32 of transformer 30 in order to provide a reset current path for resetting transformer 30 between output pulses.

The blocking oscillator 26 is conventional, and its operation, being well known, need be looked at only briefly. Assume first, that the oscillator 26 is disconnected from the circuitry above the dashed line 58, and that switch S is open. As soon as switch S is closed, the direct current source energizes the positive and negative buses 34 and 50, and a voltage derived from the tap 46 will be applied to the base of transistor 28, thereby initiating conduction in the transistor 28 and causing current to flow through primary winding 32. This induces a voltage in the various secondary windings of transformer 30.

The induced voltage in secondary winding 36 causes a positive feedback current to flow to the base of transistor 28 to increase the current through primary winding 32. The resulting cumulative action of the positive feedback rapidly forces transistor 28 into high conduction, producing a rapid rise output voltage in secondary windings 38, 40 and 42. In the meantime, when conduction was initiated in transistor 28, capacitor 62 began to charge up. As transistor 28 continues to conduct, capacitor 62 continues to charge. When the capacitor 62 reaches its charging peak, the voltage thereacross applies a reverse bias across the base-emitter junction of transistor 28 thereby cutting off conduction. The condenser 62 discharges through resistor 60 until the voltage across the condenser is too low to reverse bias the transistor 28, at which time transistor 28 begins conduction again. This cycle of events is repeated at a rate determined by the time constant of the RC circuit 58.

Rapid rise pulses are generated in the output windings 38, 40 and 42 during the charging period of the capacitor 62, the pulses ending when conduction through transistor 28 is halted by the reverse bias applied across the base junction by capacitor 62. Thus, each cycle including charge and discharge of capacitor 62 produces a pulse in the output windings 38, 40 and 42. It will be appreciated that the "running" of oscillator 26 may be stopped by biasing the transistor to cut-off, for example, by applying a reverse bias across the base-emitter junction of transistor 28, or by reducing the base voltage to a value below that required for conduction.

Circuitry 70 lying above the dashed line 68, is arranged to apply a reduced voltage clamp to the base of transistor 28 in response to the output voltage across the output terminals 18–20 resulting from single-phasing of the system. Depending on the direction of view, the resistor 24 connected across the output terminals 18–20 may be considered a load impedance in the output circuit connected to the secondary winding 16 of transformer 14, or an input impedance to circuit 70. Circuit 70 includes a current control device, for example, a thyristor as shown at T4, which is normally cut off, but which when rendered conductive, applies a reverse bias to transistor 28 to turn off the oscillator 26.

The anode of thyristor T4 is connected to the voltage divider tap 46 and its cathode is connected to a terminal 18 through a conductor 74 which is connected to one end of resistor 24 and to one side of a normally closed start switch S1. The control electrode of thyristor T4 is connected to the other end of resistor 24 and to one end of a current limiting resistor 76 whose opposite end is connected to one side of a normally open stop switch S2. The other side of switch S2 is connected to the positive bus 34. The control electrode of thyristor T4 is also connected to a tap 77 of a voltage divider 78 having one end connected to the negative bus 50, and its other end connected through a capacitor 80 to the positive bus 34. A capacitor 82 is connected across the thyristor T4 to limit the rate of rise of voltage thereacross in order to avoid damage to the thyristor or premature firing.

By way of example, components in FIG. 1 may have the following values and type designations:

Resistors:
```
    24  _____ohms__   200
    44  _____do____    50
    52  _____do____   800
    54  _____do____   200
    60  _____do____    82
    66  _____do____    30
    76  _____kilohms__  1.8
    78  _____kilohm each side of center tap__   1
```
Capacitors:
```
    62  _____mfd__     2
    80  _____mfd__    1.0
    82  _____mfd__     .02
```
Silicon controlled rectifier T4 _____ 2N2324
Transistor 28 _____ 2N2270
    B+ _____volts__  20

In order to explain the operation of the entire system, assume first that there is no voltage applied to the positive and negative D.C. buses 34 and 50. In that case the control pulse generator 26 will not be operating and the output windings 38, 40 and 42 will not be supplying control pulses to thyristors T1, T2 and T3. Under these circumstances, thyristors T1, T2 and T3 will be cut off and no power will flow from the source 12 to the load 10.

Now let it be assumed that switch S is closed thereby energizing the D.C. buses 34 and 50. As soon as switch S is closed, capacitor 80 being uncharged, charges and supplies a positive voltage derived from the voltage divider tap 77 to the control electrode of thyristor T4 thereby gating the thyristor. As a result, and before the oscillator 26 can begin to operate, the voltage at tap 46 is reduced to a value which holds transistor 28 at or below cut-off.

As the capacitor 80 is charged, the voltage at the tap 77 becomes less positive removing from that source the firing signal to the control electrode of thyristor T4. This charge is maintained because the capacitor 80 is continuously subject to the B supply voltage.

In order to start the load 10, which may for example be an induction motor, the start switch S1 is momentarily opened thereby opening the cathode circuit of thyristor T4, thus cutting off conduction therethrough. As a result, the reduced voltage bias clamp is removed from the base-emitter junction of transistor 28 and the oscillator 26 begins running, thereby supplying gating signals to thyristors T1, T2 and T3 to render them conductive and pass current to the load 10.

As long as all three phases are operating properly (full-phasing) thyristors T1, T2 and T3 will continue to pass current to the load 10, and there will be little or no output voltage at the output terminals 18–20. However, if a phase fault occurs and the system starts single-phasing, an output voltage will be developed across output terminals 18 and 20 of sufficient magnitude to gate thyristor T4 ON (render it conductive), thus applying a reduced forward bias to the base-emitter junction of transistor 28 and stopping the oscillator 26. This cuts off the control pulses to the control electrodes of thyristors T1, T2 and T3 thereby cutting the thyristors off and effectively opening the lines L1, L2 and L3.

During normal operation of the system, that is, when it is three-phasing (operating under full phase complement), power may be cut off to the motor 10 by momentarily closing the stop switch S2. This applies a firing voltage to the control electrode of thyristor T4 rendering the thyristor conductive and thereby applying the low voltage clamp for reduced forward bias to the base-emitter junction of transistor 28 to stop the oscillator 26 and cut off the control pulses from thyristors T1, T2 and T3.

From the foregoing description it is apparent that the invention provides a fast responding phase loss detector whose output may be used to provide an alarm and/or to effect a control function such as reducing the flow of power between the source and the load.

It is to be understood that the herein described arrangements are simply illustrative of the principles of the invention, and that other embodiments and applications are within the spirit and scope of the invention.

I claim as my invention:

1. In an $n$-phase system wherein $n$ is a plural whole number, $n$ lines for conveying $n$ phase power from an $n$-phase source to a load, transformer means having $n$ primary windings one for each of said lines, $n$ primary circuits each connected in series with a different one of said lines, each primary circuit including a different one of said primary windings and a half-wave rectifier in series with that winding, said transformer means having secondary winding means, rectifier means, and load means coupled to said secondary winding means through said rectifier means, said rectifier means having a threshold voltage value which is below the output voltage of the secondary winding means when said lines are full-phasing, and which threshold voltage value is above the output voltage of the secondary winding means when said lines are less than full-phasing.

2. In a three-phase system, three lines for conveying three-phase power from a three-phase source to a load, transformer means having three primary windings one for each of said lines, three primary circuits each connected in series with a different one of said lines, each primary circuit including a different one of said primary windings and a half-wave rectifier in series with that winding, said transformer means having a secondary winding, rectifier means, and load means coupled to said secondary winding through said rectifier means, said rectifier means having a threshold voltage value which is below the output voltage of the secondary winding when said lines are full-phasing, and which threshold voltage value is above the output voltage of the secondary winding when said lines are single-phasing.

3. In an $n$-phase system wherein $n$ is a plural whole number, $n$ lines for conveying $n$-phase power from an $n$-phase source to a load, transformer means having $n$ isolated primary windings, one for each of said lines, said transformer means also having secondary winding means, means for supplying to each of said primary windings half-wave current proportional to the current in its associated one of said lines, load means, and coupling means for connecting said secondary winding means to said load means, said coupling means including rectifier means for rectifying the output of the secondary winding means, whereby said load means is supplied with said rectified output, said rectifier means having a threshold value such that the output of the secondary winding means is substantially blocked from the load means by the rectifier means when said lines are carrying $n$ phases of power, and an appreciable portion of the output of the secondary winding means is passed by the rectifier means to said load means when said lines are carrying less than $n$ number of phases.

4. The combination as in claim 3, wherein the number $n$ is three and said threshold value of the rectifier means is below the output value of said secondary winding means when said lines are three-phasing, and above the output value of said secondary winding means when said lines are single-phasing.

5. In an $n$-phase system having $n$ supply lines defining the respective phases of the system connected for supplying a load and wherein $n$ is a plural whole number, phase loss detecting means comprising transformer means having $n$ primary windings, one associated with each of said lines, means for supplying to each of said primary windings half wave current derived from its associated line, said transformer means having secondary winding means, an output circuit coupled to said secondary winding means, said output circuit comprising rectifier means for rectifying current derived from said secondary winding means, said rectifier means having a threshold voltage level that is above the output voltage magnitude of said secondary winding means when said lines are supplying $n$-phase power, said threshold voltage level being below the output voltage of said secondary winding means when said lines are operating at less than full phase complement.

6. In an $n$-phase system wherein $n$ is a plural whole number, $n$ lines for transmitting $n$-phase power from an $n$-phase source to a load, switch means in each of said $n$-phase lines, each said switch means having a control element, each said switch means being operable to be rendered conductive in a particular direction in response to the presence of a control signal at said contrdol element, all of said switch means being similarly oriented relative to one end of said lines, conversion means for converting a plurality of half-wave input signals to a resultant output signal, said conversion means having a plurality of input circuits and an output circuit, an asymmetric circuit connected in parallel with each of said switch means, each asymmetric circuit including in series an asymmetric device and a different one of said input circuits of the conversion means, whereby said conversion means provides a resultant output which is a function of only half-waves of current in said lines, said conversion means providing a lower value resultant when said lines are operating with $n$-phases, and a higher value resultant when said lines are operating with less than $n$-phases, control signal generating means having an input circuit connected to the output circuit of said conversion means, said control signal generating means having output circuit means coupled to said control elements of the respective switch means, said control signal generating means having an input threshold response level such that it supplies control signals to the respective switch means in response to said lower value resultant, said control signal generating means being rendered ineffective to supply said control signals in response to said higher value resultant.

7. In a three-phase system, three lines for transmitting three-phase power from a three-phase source to a load, switch means in each of said lines, each said switch means having a control element, each said switch means being operable to be rendered conductive in a particular direction in response to the presence of a control signal at said control element, all of said switch means being similarly oriented relative to one end of said lines, conversion means for converting a plurality of half-wave input signals to a resultant output signal, said conversion means having a plurality of input circuits and an output circuit, an asymmetric circuit connected in parallel with each of said switch means, each asymmetric circuit including in series an asymmetric device and a different one of said input circuits of the conversion means, whereby said conversion means provides a resultant output which is a function of only half-waves of current in said lines, said conversion means providing a lower value resultant when said lines are operating three-phase, and a higher value resultant when operating single-phase, control signal generating means having a control input circuit connected to the output circuit of said conversion means, said control signal generating means having output circuit means coupled to said control elements of the respective switch means, said control signal generating means having an input threshold response level which is above said lower value resultant and below said higher value resultant, said control signal generating means being operable to supply control signals to the respective switch means in the absence at said control input circuit of input signals greater than said threshold response level, said control signal generating means being rendered ineffective to supply said control signals in response to the receipt by said control input circuit of input signals greater than said threshold response level.

8. In an $n$-phase system where $n$ is a whole number, $n$ lines for conveying $n$-phase power from an $n$-phase source to a load, a controlled rectifier in series in each of said lines, each controlled rectifier having a control electrode, said rectifiers being similarly poled relative to one end of said lines, transformer means having a plurality of primary windings and also having secondary winding means, an asymmetric circuit connected across each of said controlled restifiers, each of said asymmetric circuits including in series one of said primary windings and a half-wave rectifier poled opposite to the controlled rectifier shunted by the asymmetric circuit, a load circuit connected to said secondary winding means, said load circuit including load means and threshold response means interposed between the load means and the secondary winding means, said threshold response means having a threshold response value which is higher than the magnitude of the output of said secondary winding means when said lines are subjected to $n$-phasing, and which threshold value is lower than the magnitude of the output of the secondary winding means when said lines are subject to $x$-phasing, $x$ being a whole number that is smaller than $n$.

9. The combination of claim 8 and further including a circuit coupled to said load means for providing control signals to the control electrodes of said respective controlled rectifiers only when the secondary winding means output is below said threshold value, said control signal providing circuit being rendered ineffective to provide said control signals in response to said secondary winding means output being above said threshold value.

10. The combination as in claim 8 wherein $n=3$ and $x=1$, whereby $n$-phasing is three-phasing and $x$-phasing is single-phasing.

11. The combination as in claim 9 wherein $n=3$ and $x=1$, whereby $n$-phasing is three-phasing and $x$-phasing is single-phasing.

12. The combination as in claim 6 wherein each asymmetric circuit is poled opposite to said particular direction of conduction of the particular one of said switch means paralleled by that asymmetric circuit.

13. The combination as in claim 7 wherein each asymmetric circuit is poled opposite to said particular direction of conduction of the particular one of said switch means paralleled by that asymmetric circuit.

14. The combination of claim 8 wherein said threshold response means comprises rectifier means.

15. The combination of claim 8 wherein $n=3$ and $x=1$, whereby $n$-phasing is three-phasing and $x$-phasing is single-phasing, and wherein said threshold response means comprises rectifier means.

16. The combination of claim 9 wherein said threshold response means comprises rectifier means.

17. The combination of claim 9 wherein $n=3$ and $x=1$, whereby $n$-phasing is three-phasing and $x$-phasing is single-phasing, and wherein said threshold response means comprises rectifier means.

References Cited

UNITED STATES PATENTS

| | | | |
|---|---|---|---|
| 2,564,179 | 8/1951 | Tejada-Flores | 317—11.1 X |
| 3,171,112 | 2/1965 | Martin | 317—46 X |
| 3,226,559 | 12/1965 | Klein | 317—26 X |
| 3,243,796 | 3/1966 | Harmon et al. | 317—46 X |

MILTON O. HIRSHFIELD, *Primary Examiner.*

R. V. LUPO, *Assistant Examiner.*